US012667889B2

(12) United States Patent
Gonzalez Martin et al.

(10) Patent No.: US 12,667,889 B2
(45) Date of Patent: Jun. 30, 2026

(54) PRINT JOB PROCESSING

(71) Applicant: PERIDOT PRINT LLC, Palo Alto, CA (US)

(72) Inventors: Sergio Gonzalez Martin, Sant Cugat del Valles (BR); Manuel Freire Garcia, Sant Cugat del Valles (BR); Ismael Fernandez Aymerich, Sant Cugat del Valles (BR); Sergio Vera Hernandez, Sant Cugat del Valles (BR)

(73) Assignee: PERIDOT PRINT LLC, Palo Alto, CA (US)

( * ) Notice: Subject to any disclaimer, the term of this patent is extended or adjusted under 35 U.S.C. 154(b) by 676 days.

(21) Appl. No.: 17/904,253

(22) PCT Filed: Mar. 20, 2020

(86) PCT No.: PCT/US2020/024024
§ 371 (c)(1),
(2) Date: Aug. 15, 2022

(87) PCT Pub. No.: WO2021/188118
PCT Pub. Date: Sep. 23, 2021

(65) Prior Publication Data
US 2023/0102130 A1     Mar. 30, 2023

(51) Int. Cl.
| *B22F 10/31* | (2021.01) |
| *B22F 10/28* | (2021.01) |
| *B29C 64/153* | (2017.01) |
| *B29C 64/386* | (2017.01) |
(Continued)

(52) U.S. Cl.
CPC .............. *B22F 10/31* (2021.01); *B22F 10/28* (2021.01); *B29C 64/153* (2017.08); *B29C 64/386* (2017.08); *B33Y 30/00* (2014.12); *B33Y 50/00* (2014.12)

(58) Field of Classification Search
CPC ................... B23K 15/086; B28B 1/001; B22F 2003/1057
See application file for complete search history.

(56) References Cited

U.S. PATENT DOCUMENTS

| 7,604,768 B2 | 10/2009 | Kritchman |
| 9,855,698 B2 | 1/2018 | Perez et al. |
| 9,912,915 B2 | 3/2018 | Sinclair |
(Continued)

FOREIGN PATENT DOCUMENTS

| JP | 2019-518864 A | 7/2019 |
| WO | 2017/152142 A1 | 9/2017 |
(Continued)

*Primary Examiner* — Nicholas A Wang
(74) *Attorney, Agent, or Firm* — Michael Dryja

(57) ABSTRACT

According to an example, a method of processing a print job in an additive manufacturing system comprises: applying a geometrical calibration to the print job to obtain a calibrated job; determining a height of a set of print job powder layers to be formed to generate the objects based on the calibrated print job; determining a height of a set of warming powder layers to be formed prior to the set of print job powder layers; determining an ideal height of a set of annealing powder layers to be formed after to the set of print job powder layers; and determining if the combined height of the sets of layers exceeds the maximum available height.

19 Claims, 7 Drawing Sheets

100

(51) Int. Cl.
    *B33Y 30/00*       (2015.01)
    *B33Y 50/00*       (2015.01)

(56)             References Cited

U.S. PATENT DOCUMENTS

| | | | |
|---|---|---|---|
| 9,919,476 | B2 | 3/2018 | Paternoster et al. |
| 10,421,267 | B2 | 9/2019 | Reese et al. |
| 10,449,722 | B2 | 10/2019 | Sanz et al. |
| 2017/0173889 | A1* | 6/2017 | Thomas-Lepore ... H04L 51/046 |

FOREIGN PATENT DOCUMENTS

| | | |
|---|---|---|
| WO | 2018/031594 A1 | 2/2018 |
| WO | 2020/027789 A1 | 2/2020 |

* cited by examiner

100

110 — Applying a geometrical calibration

120 — Determining a height of a set of print job layers

130 — Determining a height of a set of warming layers

140 — Determining an ideal height of a set of annealing layers

150 — Determining if the combined height exceeds the maximum available height

200

210    Calculating a height by which the combined
       height exceeds the maximum available height 220    Calculating a height difference between the
       ideal height and the height by which the
       combined height exceeds the maximum
       available height 230    Comparing the height difference with a minimum
       annealing height 240    Determining whether is acceptable to process
       the print job

900

910 — Apply a calibration model to a print job

920 — Compute a height of a set of print job layers

930 — Determine a height of a set of warming layers

940 — Determine an ideal height of a set of annealing layers

950 — Indicate if the combined height exceeds a maximum available height

1000

PRINT JOB PROCESSING

BACKGROUND

Additive manufacturing systems generate three-dimensional objects by distributing subsequent layers of build materials. A print job may comprise a series of three-dimensional objects to be generated by the additive manufacturing system, wherein the objects have a spatial arrangement with respect to each other.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
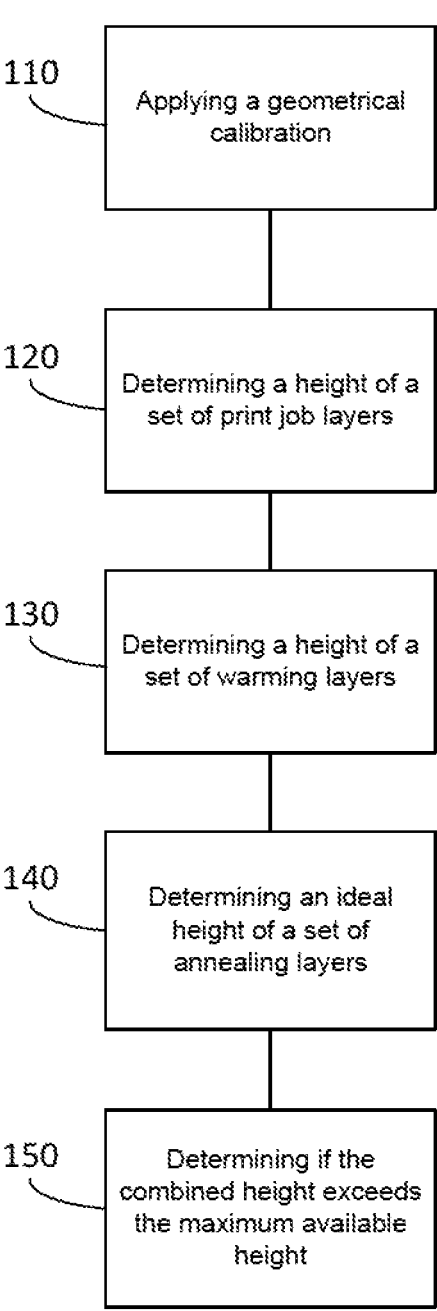
FIG. 1 shows a method of processing a print job in a powder-based additive manufacturing system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Additive manufacturing techniques may generate a three-dimensional object through the solidification of a build material. In an example, the build material is a powder-like granular material, which may for example be a plastic, ceramic or metal powder and the properties of generated objects may depend on the type of build material and the type of solidification mechanism used. In other examples, the powder may be formed from, or may include, short fibers that may, for example, have been cut into short lengths from long strands or threads of material. Build material may be deposited, for example on a print bed and processed layer by layer, for example within a build chamber of an additive manufacturing system. According to one example, a suitable build material may be PA12 build material commercially referred to as V1R10Series "HP PA12" available from HP Inc.

In some examples, selective solidification is achieved through directional application of energy, for example using a laser or electron beam which results in melting, and subsequent solidification, of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may, for example, be determined from structural design data). The fusing agent may have a composition which absorbs energy such that, when energy (for example, heat) is applied to the layer, the build material to which it has been applied heats up, coalesces and solidifies, upon cooling, to form a layer of the three-dimensional object in accordance with the pattern. In other examples, coalescence may be achieved in some other manner.

According to an example, a suitable fusing agent may be an ink-type formulation comprising carbon black, such as, for example, the fusing agent formulation commercially referred to as V1Q60Series "HP fusing agent" available from HP Inc. Such a fusing agent may comprise any or any combination of an infra-red light absorber, a near infra-red light absorber, a visible light absorber, and a UV light absorber. Examples of fusing agents comprising visible light absorption enhancers are dye based colored ink and pigment based colored ink, such as inks commercially referred to as V1Q73Series, V1Q74Series, V1Q75Series and V1Q76Series available from HP Inc.

In some examples, in addition to a fusing agent, a print agent may comprise a detailing, or coalescence modifier, agent, which acts to modify the effects of a fusing agent for example by reducing or increasing coalescence or to assist in producing a particular finish or appearance of an object. In some examples, detailing agent may be used near edge surfaces of an object being printed to reduce thermal bleed. According to one example, a suitable detailing agent may be a formulation commercially referred to as V1Q61Series "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate three-dimensional objects based on structural design data. This may involve a designer designing a three-dimensional model of a three-dimensional object to be generated, for example using a computer aided design (CAD) application. The print job may define the solid portions of a series of three-dimensional objects having a spatial arrangement. To generate the three-dimensional object from the print job using an additive manufacturing system, the print job may comprise, or can be processed to derive, slices or parallel planes of the objects. Each slice may define a portion of a respective layer of build material that is to be solidified or caused to coalesce by the additive manufacturing system.

During the generation of an object by additive manufacturing, particularly where heat may be applied to the object, deformations may occur resulting in an object being generated which does not have the expected dimensions. The deformations may depend on any or any combination of factors such as the build material used, the type of additive manufacturing, the location of the object within the fabrication chamber of the additive manufacturing apparatus, object volume and the like.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the region(s) to which fusing agent is applied. In order to compensate for this effect, i.e. where it is anticipated that an object may tend to 'grow' during manufacture, the object volume as described in object model data may be reduced.

In some examples, the deformations may depend on the object's location within the build chamber of the additive manufacturing apparatus. This may be because the thermal characteristics vary throughout the fabrication chamber, for example there may be small differences in temperature in different locations. In some examples, objects which are near the bottom of the chamber may be maintained at a higher temperature for a longer period than those located near the top of the fabrication chamber because objects generated near the bottom of the chamber will be generated near the start of the fabrication process, whereas those near the top will be generated later in the process. This may lead to a difference in cooling rates, which may impact deformations. Other differences may exist, for example due to inhomogeneities in heating or cooling, and/or heating or cooling rates, due to the location of heating or cooling elements and/or due to proximity to walls of the fabrication chamber which may affect the cooling rate of build material.

Three-dimensional objects may be subjected to mechanisms during their generation which result in growth and/or shrinkage, and the appropriate transformation to apply may be influenced by the different degrees to which the object may be affected by such processes.

Such compensations may be applied using geometrical calibration(s) which may include scaling and/or offsets. For example, a geometrical calibration may comprise at least one scaling factor and/or at least one offset value, and in some examples associate a scaling factor and/or offset value with at least one of three orthogonal axes (e.g. x, y and z, wherein the z-direction is taken herein to be the direction perpendicular to layers of deposited build material and x- and y-directions are in the plane of the deposited layers). A scaling factor may be used to multiply object dimensions in the direction of at least one axis by a value, which may be greater than 1 in order to increase the dimension(s) and less than 1 to reduce the dimension(s), or equal to 1 to have no effect. The scaling factor may be applied to dimensions of an object model, for example being applied to a mesh model of the object.

An offset may specify, for example by a specified distance or a number of defined voxels (i.e. 3D pixels), an amount to add or remove from a surface of the object (or a perimeter within a layer). For example, an offset distance in an axis may be specified and the object may be eroded or may be dilated (i.e., inflated or enlarged) by this distance, for example by moving the vertices of a mesh in the case that the object model is a mesh model, or adding/subtracting a number of voxels in a vowelized model although other methods of providing an offset may be used in other examples.

In summary then, to compensate for anticipated deformations a print job describing the three-dimensional objects to be generated may be modified before commencing the build process. The modifications may comprise a scaling, whereby the object is 'stretched' or 'compressed' along an axis or axes and/or a surface offset operation which comprises applying either an erosion or dilation operation to a surface of the object.

In some examples the modifications, such as scaling, are applied to a print job comprising a series of three-dimensional objects having a spatial arrangement. If a positive scaling/offset is applied to the objects, then the overall size of the objects is increased and therefore the amount of build material used when generating the objects can be affected (which may in turn reduce the amount of unused build material in a fabrication chamber, which would otherwise be available for recycling). Additional print agent may also be consumed. When the scaling/offset is in the z, or height, dimension, this means that generation of the objects may use more layers of build material than anticipated, which in turn can increase the time used in generating objects.

In an example, a geometrical calibration is defined for a print job. The geometrical calibration may comprise data describing how to anticipate deformations of the three-dimensional objects to be generated. The anticipated deformations may be affected, for instance, by its location within the build chamber. In some examples, other factors may also be considered when determining the geometrical calibration of the sets of objects, for example the type of build material, dimensions (e.g. object volume), or intended dimensional accuracy for the object to be generated.

In some examples, the geometrical calibration may be determined for each individual additive manufacturing printer or each build chamber. In other examples, the geometrical calibration may be determined for a type of additive manufacturing printer or build chamber. In some other examples, the geometrical calibration may vary over the lifetime of the additive manufacturing apparatus and may be updated throughout the lifetime of the apparatus.

A series of objects (one or more objects) may be generated in a single fabrication process. Due to limited space within a build chamber of an additive manufacturing system, print job dimensions may be checked before the fabrication process. In other words, the print job may be checked before generating the sets of layers within an additive manufacturing system. How such objects are arranged within the build chamber can affect the quantity of build material used in generating the objects, the time taken to generate the objects and the quality of the generated objects. For example, if objects are arranged such that adjacent objects interact, then the quality of the generated objects can be affected, for example if adjacent objects are spaced too closely together, the thermal interaction of one object may adversely affect another object causing deformations in said object(s).

In an example, a three-dimensional object is to be generated with a height of 380 mm. When such an object is located in a region with a 5% z-scaling (a scaling factor value of 1.05), the object will be generated from layers having a height of 399 mm. Therefore, the objects generated during the additive manufacturing process are geometrically modified by the scaling factor(s). In an example additive manufacturing apparatus that uses a layer thickness of 80 microns, such an object would comprise 4988 layers. In contrast, if the same object is located in a region with a z-scaling of 2.5% (a scaling factor value of 1.025), the object would be generated from layers having a height of 389.5 mm, which in the same additive manufacturing apparatus would comprise 4869 layers. Therefore, by locating the object in the region with lower z-scaling the number of layers used in generating the object can be reduced by 119 layers compared to the alternative example.

In other examples, a height may be calculated for a print job comprising a series of objects having a spatial arrangement. By applying a geometrical calibration to the print job, a calibrated print job may be obtained. The calibrated print job may represent the height of the series of layers needed to generate the print job during the additive manufacturing process. Therefore, a print job height may be calculated based on the anticipated dimensions of the calibrated print job.

Additional build material, for instance additional sets of layers, may be added to a print job when being processed by an additive manufacturing printer. The additional layers may be positioned prior to the layers, referred to herein as warming layers, associated to the print job and/or after the layers associated to the print job. The additional set(s) of layers may enhance the quality of the objects by helping to ensure thermal uniformity within the build chamber. In an example, an additional set of layers, referred to herein as annealing layers, may be positioned above the set of layers in which the three-dimensional objects are generated. The annealing powder layers are to be distributed into the build chamber after the layers associated to the print job so that the three-dimensional objects generated in the layers associated to the print job to improve thermal uniformity for the upper layers in which three-dimensional objects are generated.

In some examples, the warming powder layers height and/or the annealing powder layers height are calculated based on the calibrated print job. In other examples, the warming powder layers height and/or the annealing powder layers height are determined based on the geometries of the three-dimensional objects comprised within the print job, the distribution of the three-dimensional objects, or a combination thereof. However, in other examples, the warming powder layers and the annealing powder layers may have predefined height, for instance a warming height for warming powder layers and an annealing height for the set of annealing powder layers. The predefined heights may be defined based on the additive manufacturing apparatus or the build chamber.

Referring now to FIG. 1, a method 100 of processing a print job in a powder-based additive manufacturing system is shown. The print job may define a spatial arrangement of a series of objects to be printed in a build chamber having a maximum available height, wherein the series of objects comprise one or more objects. The method 100 comprises: applying a geometrical calibration 110 to the series of objects of the print job to obtain a calibrated print job; determining a height of a set of print job layers 120 to be formed to generate the objects based on the calibrated print job; determining a height of a set of warming layers 130 to be formed prior to the set of print job powder layers; determining an ideal height of a set of annealing layers 140 to be formed after to the set of print job powder layers; and determining if the combined height exceeds the maximum available height 150. The combined height is obtained by aggregating the height of the set of print job powder layers, the height of the set of warming powder layers and the ideal height of the set of annealing powder layers. In an example, the geometrical calibration may be one of the examples previously presented in the description.

However, the method 100 may comprise further actions. In some examples, method 100 may further comprise modifying the print job if the combined height exceeds the maximum available height, wherein the modification comprises applying a corrective action(s). Examples of corrective actions comprise: defining a new spatial arrangement of the series of objects that reduces the height of the set of print job powder layers such that the combined height is below the maximum available height of the build chamber, removing objects of the series of objects to reduce the height of the set of print job powder layers such that the combined height is below the maximum available height of the build chamber, or a combination thereof.

Figure 2:
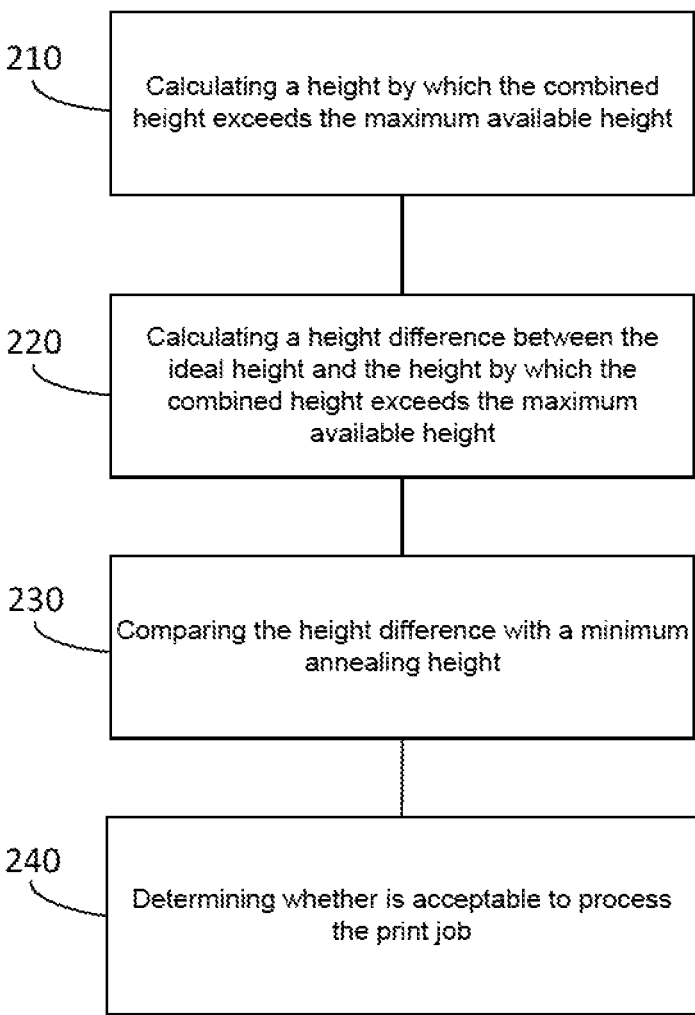
FIG. 2 shows an additional method of processing a print job in a powder-based additive manufacturing system, according to an example of the present disclosure.

Referring now to FIG. 2, an additional method 200 of processing a print job is shown. In an example, the method 100 further comprises the additional method 200. The print job may comprise a spatial arrangement of a series of objects to be printed in a build chamber having a maximum available height, as previously explained in reference to other examples. The method 200 comprises: calculating a height by which the combined height exceeds the maximum available height 210; calculating a height difference between the ideal height and the height by which the combined height exceeds the maximum available height 220; comparing the height difference with an minimum annealing height 230; and determining whether is acceptable to process the print job 240. In an example, a print job is considered as acceptable if the height difference is greater than the minimum annealing height.

In an example, the minimum annealing height defines a minimum height of powder to be formed after to the set of print job layers corresponding to the print job.

In other examples, the minimum annealing height may be calculated based on the calibrated print job, for instance, as a minimum height of powder to generate the print job while achieving a minimum standard of quality.

In other examples, the method 200 may further comprise indicating on a display device, the object (or objects) of the series of objects which are expected to be thermally affected by not being covered with the ideal height of annealing layers, i.e., with less than the ideal height of powder layers. If any of the objects of the series of objects is to be covered by less than the ideal height of powder layers, the quality of the object (or objects) can be affected.

In some other examples, method 200 may further comprise identifying objects of the series of three-dimensional objects that are likely to be affected by the build process not being able to provide the ideal height of annealing layers. In further examples, corrective actions may be suggested for the objects expected to be thermally affected by not being covered by the ideal height of annealing layers. Amongst others, examples of corrective actions may be deleting objects, redefining the spatial arrangement, or a combination thereof.

Figure 3:
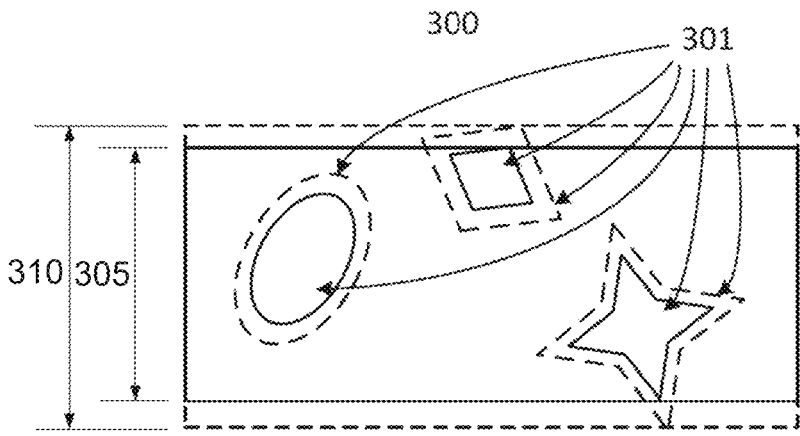
FIG. 3 shows a cross-sectional side view of a virtual build volume, according to an example of the present disclosure.

Referring now to FIG. 3, a cross-sectional side view of a virtual build volume representing the usable volume of a physical build chamber is shown. The virtual build volume comprises a print job 300 having a spatial arrangement for a series of objects 301. The print job 300 has a job height 305, wherein the job height 305 is the height of the layers used to generate the print job 300 within a build chamber of the additive manufacturing system. A geometrical calibration may be applied to the print job 300 so that a calibrated print job is obtained. In FIG. 3, the calibrated print job is indicated with dashed lines. The calibrated print job has a calibrated print job height 310. The calibrated print job height 310 is the height with on layers required to generate the calibrated objects. In an example, the calibrated print job height 310 corresponds to the set of print job powder layers to be formed to generate the series of objects 301 based on the calibrated print job.

It should be noted that, although in FIG. 3 the geometrical calibration is performed proportionally along the height of the print job, in other examples the geometrical calibration may correspond to the examples previously described in the description.

Figure 4:
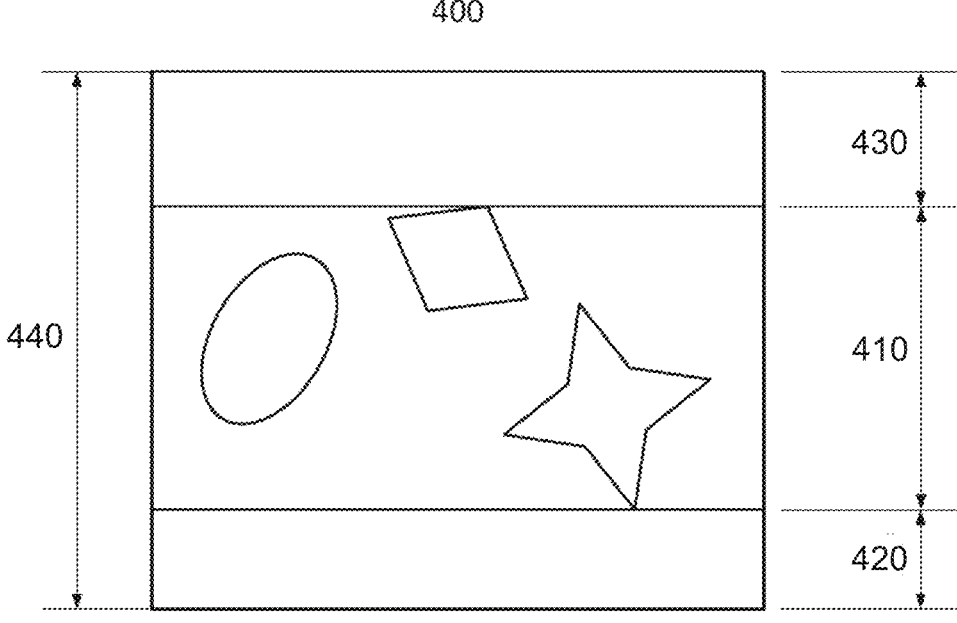
FIG. 4 shows a cross-sectional side view of a virtual build volume comprising layers, according to an example of the present disclosure.

Referring now to FIG. 4, a side view cross-section of a virtual build volume comprising powder layers 400 is shown. The layers 400 comprise a set of print job layers having a height 410, a set of warming layers having a height 420 and a set of annealing layers having a height 430. In addition, the layers 400 comprise a combined height 440 corresponding to the sum of the height 410 of the set of print job layers, the height 420 of the set of warming layers and the height 430 of the set of annealing layers.

In some examples, each of the heights (height 410, height 410 and height 430) can be defined relative to the virtual build volume. The height 410 of the set of print job layers may comprise the height of the layers required to generate the series of objects, i.e., from the lowermost portion of the lowest object to the uppermost portion of the top object. The height 420 of the set of warming layers comprises the height of the warming layers. Finally, the annealing layers have a height from the top of the set of print job layers to the top of virtual build volume.

According to some examples, an additive manufacturing system comprises a build chamber having a maximum available height. In order to correctly generate the series of objects, the build chamber in which the 3D printer is to generate the objects has to have a usable height that it greater than the height of the layers 400. If the combined height 440 is greater than the maximum available height, corrective action(s) may be performed in the print job to reduce the difference, as previously explained in the description.

Figure 5:
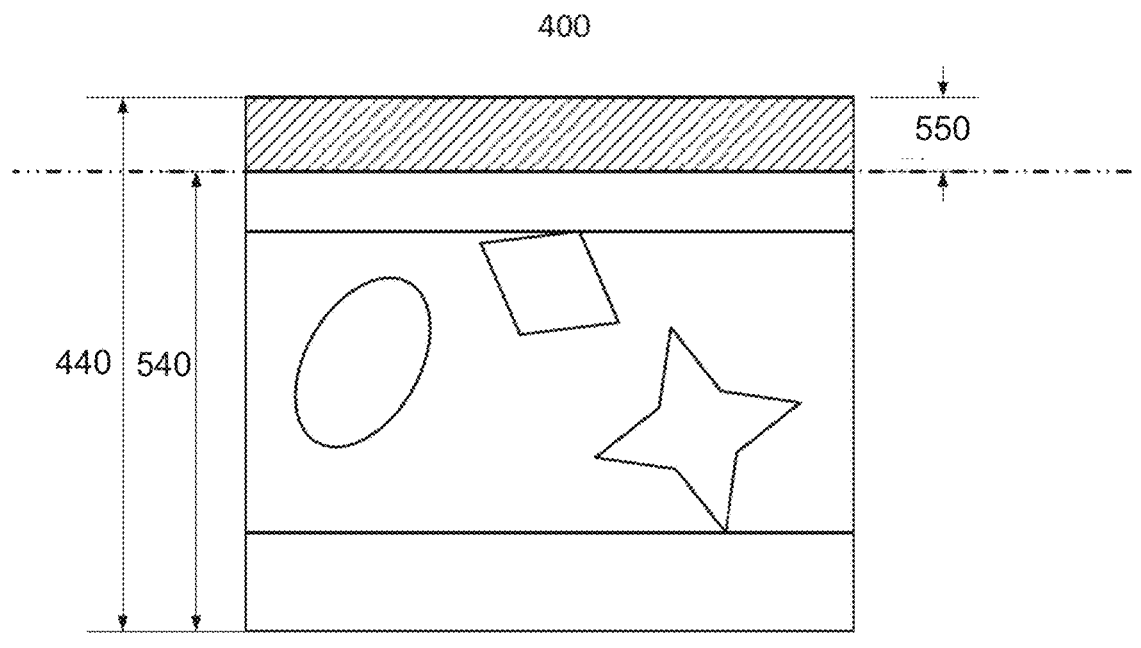
FIG. 5 shows a cross-sectional side view of a virtual build volume having a maximum available height, according to an example of the present disclosure.

Referring now to FIG. 5, a cross-sectional side view of a virtual build volume having a maximum height 540 is shown. A combined height 440 comprises the height of the three sets of layers, i.e. the height of the set of print job layers, the height of the set of warming layers and the height of the set of annealing layers. In an example, the maximum height 540 may correspond to the maximum available height of a build chamber of an additive manufacturing system, as represented by the horizontal dashed line. Since the combined height 440 is greater than the maximum height 540, the layers 400 will not fit within the build chamber of the additive manufacturing system. A difference 550 may be calculated for the layers 400, wherein the difference 550 is a height by which the combined height 440 of the layers 400 exceeds the maximum height 540.

In other examples, a height difference is calculated for the layers 400. The height difference may be defined as a difference between the ideal height of the set of annealing layers and the height by which the combined height 440 exceeds the maximum height 540. In an example, the ideal height of the set of annealing layers may correspond to the third height 430 of FIG. 4.

According to some examples, a minimum annealing height may be defined for a print job, wherein the minimum annealing height comprises a minimum height of powder to be formed after the height of the set of print job layers.

Figure 6:
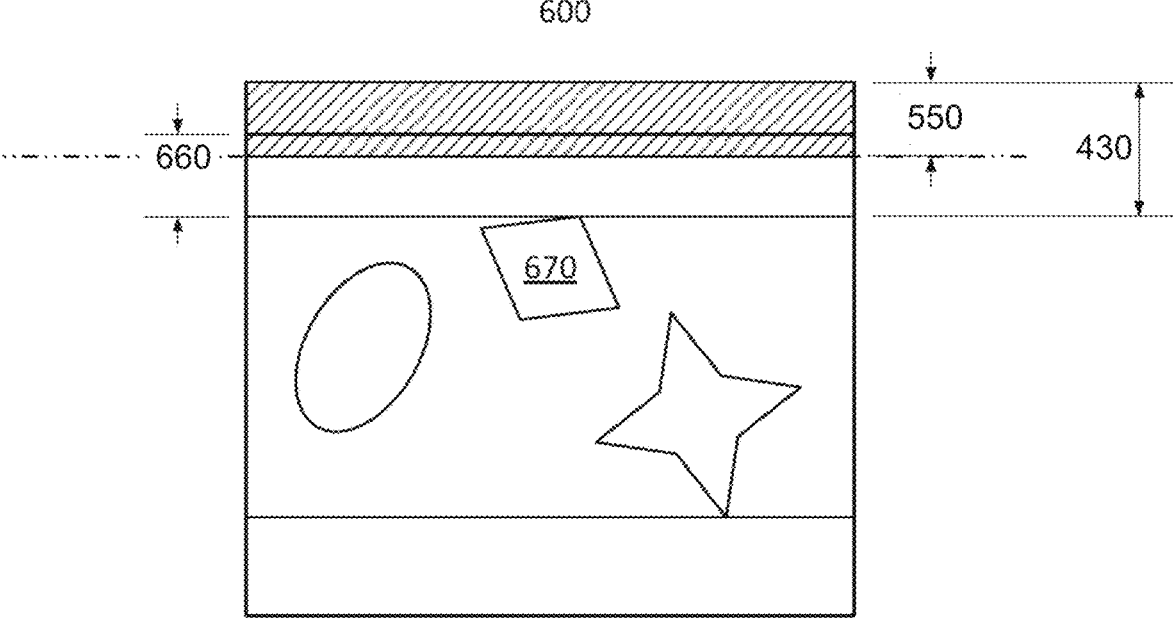
FIG. 6 shows a cross-sectional side view of a virtual build volume having a minimum annealing height, according to an example of the present disclosure.

Referring now to FIG. 6, a cross-sectional side view of a virtual build volume having a minimum annealing height 660 is shown. As previously described in FIGS. 4 and 5, the layers 600 comprise a height for the set of print job layers, a height for the set of warming layers and a height 430 for the set of annealing layers. The layers 600 comprise a difference 550, wherein the difference 550 is a height by which the combined height of the layers 600 exceeds the maximum height, as previously described in FIG. 5. A horizontal dashed line indicates the maximum available height for the virtual build volume, as previously explained in FIG. 5. The minimum annealing height 660 may be defined as a minimum height of powder to be formed after the set of print job layers.

In FIG. 6, a height difference may be calculated for the layers 600. The height difference may be calculated between the ideal height of the set of annealing layers and the difference 550. If the height difference is greater than the minimum annealing height 660, the print job is considered as not acceptable to be processed, as doing so may impact the quality of at least some of the objects. If the height difference is lower or equal than the minimum annealing height 660, the print job is considered as acceptable to be processed with less than the ideal height of annealing layers.

In the example of FIG. 6, the print job is considered as not acceptable to be processed, since the minimum annealing height 660 and the difference 550 overlap. In that case, the print job may be modified so as to fit in the available height.

In some examples, corrective actions may be performed on the print job, such as deleting an object of the series of objects, rearranging the objects in a new spatial arrangement, or a combination thereof. Examples of corrective actions in the layers 600 comprise, for instance, modifying the location of an object 670 so that the object is moved to a lower position to enable the layers 600 to fit in the maximum height. In other examples, an object may be moved to a position that enables to print with less than the ideal height of annealing layers, i.e. with a third height between the ideal height and the minimum annealing height. Other examples of corrective actions comprise moving the third object the one having (a four-point star shape) to a higher position relative to the other objects so that the first height of the set of print job layers is reduced. In further examples, corrective actions comprise deleting one of the objects, for instance the second object or the third object.

Figure 7:
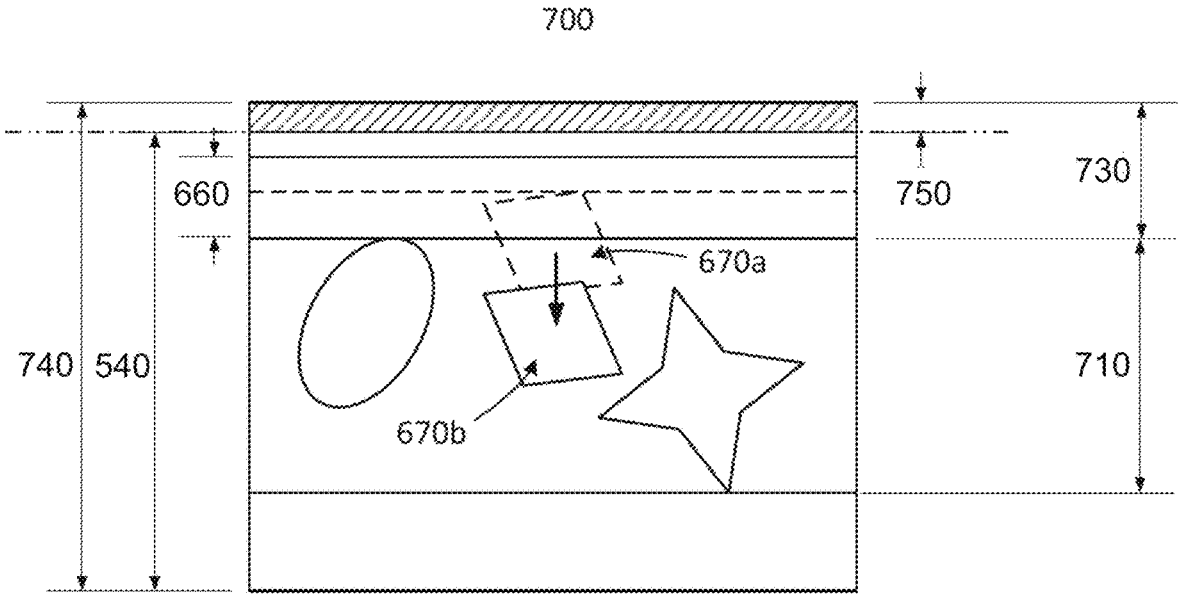
FIG. 7 shows a virtual build volume having a new spatial arrangement, according to an example of the present disclosure.

Referring now to FIG. 7, a virtual build volume having a new spatial arrangement is shown. The new spatial arrangement of layers 700 represents the layers 600 after a corrective action is performed over the print job. The corrective action comprises moving the object 670 from a first location 670a to a second location 670b, i.e., downwards within the virtual build volume. For illustrative purposes, the previous position of the second object has been indicated with dashed lines. The maximum height 540 may remain the same for the build chamber (or virtual build volume), and then, a new difference 750 may be determined between a combined height 740 and the maximum height 540. The combined height 740 comprises the heights of the set of print job layers, the set of warming layers, and the set of annealing layers. Since the second location 670b of the second location is different than the first location 670a, a new first height 710 may be determined. In the same way, a new third height 730 may be determined. Furthermore, a new height difference is calculated between the new third height 730 and the new difference 750. The new height difference may be compared with the minimum annealing height 660, previously described in FIG. 6.

In the example of FIG. 7, the print job may be considered as acceptable to be processed with less than the ideal height of layers, since the minimum annealing height 660 and the difference 750 do not overlap. However, since the new third height is less than the ideal height, the quality of the objects of the print job may be affected.

Figure 8:
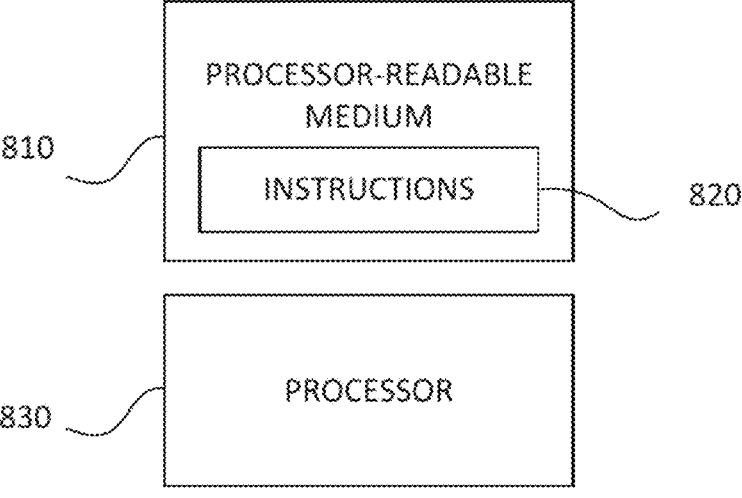
FIG. 8 shows a processor-readable medium and a processor, according to an example of the present disclosure.

Referring now to FIG. 8, a processor-readable medium 810 and a processor 830 are shown. The processor-readable medium 810 comprises instructions 820 stored thereon, that when executed, cause the processor 830 to perform a method. Examples of method comprise the method 100 described previously in the description. In other example, the method 100 may further comprise the additional method 200.

In some examples, the processor-readable medium 810 may be a computer-readable storage medium. However, in other examples processor-readable medium 810 may be any non-transitory tangible medium that can embody, contain, store, or maintain instructions for use by a processor 830. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

Figure 9:
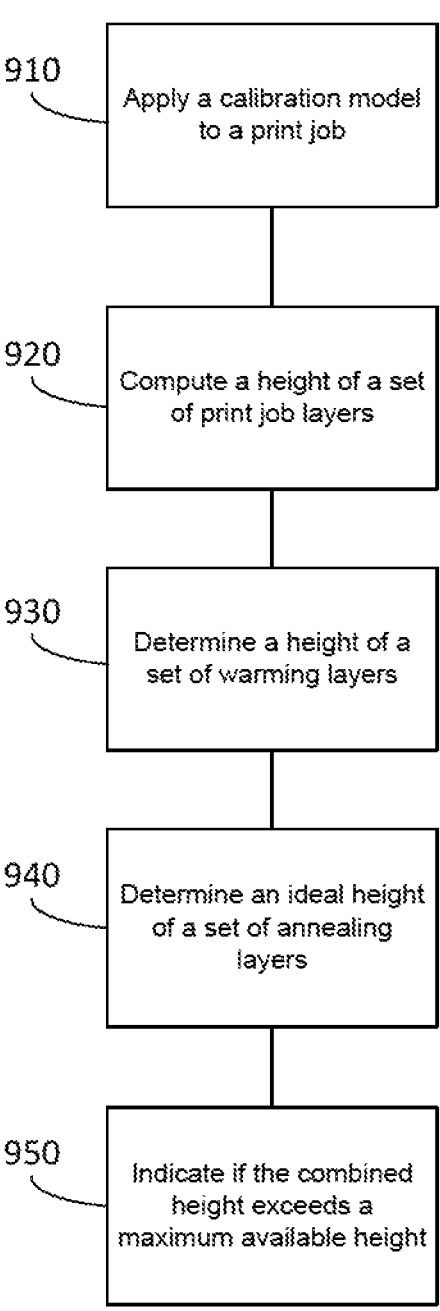
FIG. 9 shows a set of instructions, according to an example of the present disclosure.

Referring now to FIG. 9, a set of instructions 900 is shown. The set of instructions 900, when executed by a processor, may cause the processor to perform a method. The set of instructions 900 cause a processor to: apply a calibration model to a print job 910, computer a height of a set of print job layers 920, determine a height of a set of warming layer 930, determine an ideal height of a set of annealing layers 940, and indicate if the combined height exceeds a maximum available height 950.

Apply a calibration model to a print job 910 comprises obtaining a calibrating print job, wherein the print job comprises a series of objects disposed within a virtual build volume, as previously explained in reference to FIG. 3. The calibration model may correspond to the previously described geometrical calibration. In an example, the virtual build volume represents the dimensions of a build chamber of an additive manufacturing system. Compute a height of a set of print job layers 920 comprises computing a height of a set of print job powder layers to be formed to generate the series of objects. In an example, computation is based on the calibrated print job. Determine a height of a set of warming layers 930 comprises determining a height of a set of warming powder layers to be formed below the set of print job powder layers, wherein the height of the set of warming layers is between the bottom of the virtual build volume and a lowermost object of the series of objects. Determine an ideal height of a set of annealing layers 940 comprise determining a height of a set of annealing powder layers to be formed above the set of print job powder layers, wherein the ideal height is between the top of the virtual build volume and an uppermost object of the series of objects. Then, indicate if the combined height exceeds a maximum available height 950 comprises comparing the combined height determined for the three sets of powder layers with the maximum available height of the virtual build volume.

As previously explained in the description, the determination of the height of the set of warming powder layers and the set of annealing powder layers may be based on several characteristics, for instance the print job content or the type of build material used. In other examples, the set of warming layers and the set of annealing layers are having a fixed value, for instance a default height for the warming powder layers and a default height for the annealing powder layers.

However, the combined height may exceed the maximum available height of the virtual build volume. In such cases, the set of instructions 900 may further comprise instructions to perform further actions, such as applying corrective actions.

In an example, the instructions further cause the processor to calculate a height by which the combined height of the powder layers exceeds the maximum available height, to compare the height with a minimum distance, and to indicate if the minimum distance exceeds the height. The minimum distance may be a minimum distance from the top of the virtual build volume which indicates a minimum height for the set of warming powder layers. Referring back to FIG. 6, the minimum distance may be the distance from the top to the upper reference of the minimum annealing height 660. In case that the minimum distance exceeds the height by which the combined height of the powder layers exceeds the maximum available height the processor may identify the objects of the series of objects that are likely to be affected by the height.

In other examples, the processor-readable medium may comprise further instructions to cause the processor to display on a screen the objects of the series of objects that are likely to be affected by being covered by less than the ideal height. In an example, the screen may be comprised in an additive manufacturing system or an electronic device.

In some other examples, the processor-readable medium may comprise further instructions to cause the processor to define a new spatial arrangement for the series of objects if is indicated that the minimum distance exceeds the height, wherein the new spatial arrangement reduces the height of the set of print job powder layers such a that the combined height is below the maximum available height, as previously explained in reference to FIGS. 5 to 7.

Figure 10:
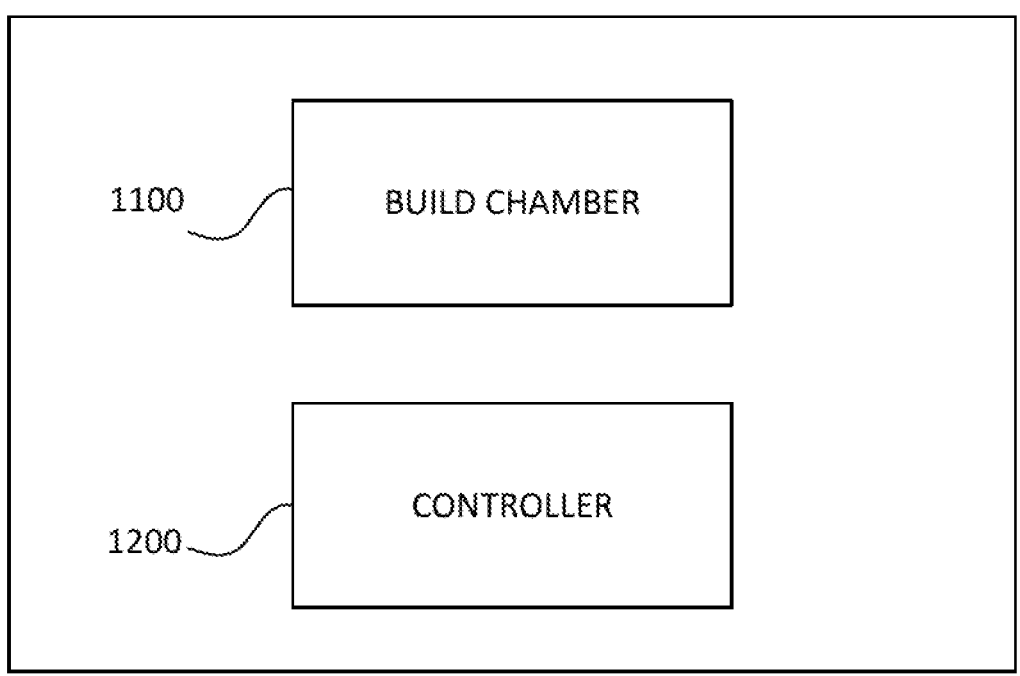
FIG. 10 shows an additive manufacturing printer comprising a build chamber and a controller, according to an example of the present disclosure.

Referring now to FIG. 10, an additive manufacturing printer 1000 comprising a build chamber 1100 and a controller 1200 is shown. The build chamber 1100 has a maximum available height that indicates the maximum height of build material acceptable within the build chamber 1100. Sets of layers may be disposed within the build chamber 1100 to generate a print job. As previously explained, a print job may comprise a series of objects to be generated having a spatial arrangement. The controller 1200 of the additive manufacturing printer 1000 may perform actions to determine if the print job can be generated within the build chamber 1100. In an example, the controller 1200 applies calibration data to the print job to obtain a calibrated print job. The calibration data, for instance, may be a geometrical calibration as previously explained in the description. Then, the controller 1200 may determine a height of a set of print job layers based on the calibrated print job. Then, the controller 1200 may determine a height of a set of warming layers to be disposed below the set of print job powder layers. The controller may further determine an ideal height of a set of annealing layers, wherein the set of annealing layers is to be disposed above the set of print job layers. In an example, the height of the set of print job layers, the height of the set of warming layers and the ideal height of the set of annealing layers correspond to the first height 410, the second height 420, and the third height 430 of FIG. 4, respectively. Then, the controller 1200 may compute a combined height of layers, i.e. the combined height 440 of FIG. 4. The controller 1200 may further determine if the combined height exceeds the maximum available height of the build chamber 1100.

In some other examples, if the combined height exceeds the maximum available height, the controller 1200 determines a height by which the combined height of the layers exceeds the maximum available height. If the height is below a minimum difference, the printer may get into an annealing error state. The minimum difference may be a minimum distance of layers from the top of the build chamber 1100 which indicates a minimum height for the set of warming powder layers. During the annealing error state, the additive manufacturing printer 1000 may perform corrective actions over the print job.

In further examples, if the combined height exceeds the maximum available height of the build chamber 1100, corrective actions are performed over the print job. The corrective actions may comprise one of defining a new spatial arrangement and removing objects of the series of objects. Defining a new spatial arrangement comprises modifying the spatial arrangement of the series of objects of the print job that reduces the height of the set of print job layers such that the combined height is below the maximum available height. Removing objects of the series of objects comprises removing the objects which may enable to reduce the height of the set of print job layers. However, other corrective actions may be performed, such as a combination of two corrective actions.

In other examples, the additive manufacturing printer 1000 may further comprise a screen. In case that the combined height of the layers exceeds the maximum available height of the build chamber 1100, a signal may be displayed on the screen. In other examples, the screen may be used to indicate objects of the series of objects likely to be affected by the corrective actions.

However, in other examples, the additive manufacturing printer 1000 may generate the layers with less than the ideal height of layers. In an example, the controller 1200 may perform the method 200 of FIG. 2 to check whether is acceptable to process the print job with less than the ideal height of annealing layers.

According to other examples, the controller 1200 may access to a memory comprising instructions. The instructions may be the instructions 900 previously described in FIG. 9. In other examples, the controller 1200 may access to instructions to perform the method 100 of FIG. 1.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method comprising:

receiving, by a powder-based additive manufacturing printer, a print job defining a spatial arrangement of a series of objects to be printed in a build chamber of the printer, the build chamber having a maximum available height;

applying, by the printer, a geometrical calibration to the series of objects to account for dimensional object deformation during printing, resulting in a calibrated print job in which a height of the series of objects is greater in the calibrated print job than in the received print job;

determining, by the printer, a height of an object set of powder layers to be formed in the build chamber to generate the objects based on the calibrated print job;

determining, by the printer, a height of an annealing set of powder layers to be formed in the build chamber after the object set of powder layers, where no portion of any object is formed in the annealing set;

determining, by the printer, whether a sum of the heights of the object and annealing sets of powder layers exceeds the maximum available height of the build chamber;

in response to determining that the sum does not exceed the maximum available height of the build chamber, printing, by the printer, the series of objects in accordance with the calibrated print job by forming the object set of powder layers, and then the annealing set of powder layers; and in response to determining that the sum exceeds the maximum available height of the build chamber, not printing, by the printer, the series of objects in accordance with the calibrated print job, wherein the annealing set of powder layers are formed to insulate the printed series of objects to maintain a cooling profile during object cooling.

2. The method of claim 1, further comprising, in response to determining that the sum exceeds the maximum available height of the build chamber, modifying the calibrated print job by defining a new spatial arrangement that reduces the sum to below the maximum available height.

3. The method of claim 1, further comprising, in response to determining that the sum exceeds the maximum available height of the build chamber, modifying the calibrated print job by removing objects from the series of objects to reduce the sum to below the maximum available height.

4. The method of claim 1, further comprising, in response to determining that the sum exceeds the maximum available height of the build chamber:

calculating an amount by which the sum exceeds the maximum available height;

calculating a difference between the determined height of the annealing set of powder layers and the amount by which the sum exceeds the maximum available height;

comparing the difference with a minimum height of powder layers to maintain the cooling profile during object cooling; and determining whether to print the series of objects in accordance with the calibrated print job with less than the determined height of the annealing set of powder layers, based on a result of comparing the difference with the minimum height.

5. The method of claim 4, further comprising, in response to determining that the sum exceeds the maximum available height of the build chamber, indicating on a screen that the series of objects cannot be printed with the determined height of the annealing set of powder layers.

6. A non-transitory computer-readable data storage medium storing instructions executable by a processor of a powder-based additive manufacturing printer to perform processing comprising:

receiving a print job defining a spatial arrangement of a series of objects to be printed in a build chamber of the printer, the build chamber having a maximum available height;

applying a geometrical calibration to the series of objects to account for dimensional object deformation during printing, resulting in a calibrated print job in which a height of the series of objects is greater in the calibrated print job than in the received print job;

determining a height of an annealing set of powder layers to be formed in the build chamber to generate the objects based on the calibrated print job;

determining a height of an annealing set of powder layers to be formed in the build chamber after the object set of powder layers, where no portion of any object is formed in the annealing set;

determining whether a sum of the heights of the object and annealing sets of powder layers exceeds the maximum available height of the build chamber;

in response to determining that the sum does not exceed the maximum available height of the build chamber, printing the series of objects in accordance with the calibrated print job by forming the object set of powder layers, and then the annealing set of powder layers; and in response to determining that the sum exceeds the maximum available height of the build chamber, not printing the series of objects in accordance with the calibrated print job, wherein the annealing set of powder layers are formed to insulate the printed series of objects to maintain a cooling profile during object cooling.

7. The non-transitory computer-readable data storage medium of claim 6, wherein the processing further comprises, in response to determining that the sum exceeds the maximum available height of the build chamber, modifying the calibrated print job by defining a new spatial arrangement that reduces the sum to below the maximum available height.

8. The non-transitory computer-readable data storage medium of claim 6, wherein the processing further comprises, in response to determining that the sum exceeds the maximum available height of the build chamber, modifying the calibrated print job by removing objects from the series of objects to reduce the sum to below the maximum available height.

9. The non-transitory computer-readable data storage medium of claim 6, wherein the processing further comprises, in response to determining that the sum exceeds the maximum available height of the build chamber:

calculating an amount by which the sum exceeds the maximum available height;

calculating a difference between the determined height of the annealing set of powder layers and the amount by which the sum exceeds the maximum available height;

comparing the difference with a minimum height of powder layers to maintain the cooling profile during object cooling; and determining whether to print the series of objects in accordance with the calibrated print job with less than the determined height of the annealing set of powder layers, based on a result of comparing the difference with the minimum height.

10. The non-transitory computer-readable data storage medium of claim 6, wherein the processing further comprises, in response to determining that the sum exceeds the maximum available height of the build chamber, indicating on a screen that the series of objects cannot be printed with the determined height of the annealing set of powder layers.

11. A powder-based additive manufacturing printer comprising:

a build chamber having a maximum available height;

a processor; and a memory storing instructions executable by the processor to perform processing comprising:

receiving a print job defining a spatial arrangement of a series of objects to be printed in the build chamber;

applying a geometrical calibration to the series of objects to account for dimensional object deformation during printing, resulting in a calibrated print job in which a height of the series of objects is greater in the calibrated print job than in the received print job;

determining a height of an object set of powder layers to be formed in the build chamber to generate the objects based on the calibrated print job;

determining a height of an annealing set of powder layers to be formed in the build chamber after the object set of powder layers, where no portion of any object is formed in the annealing set;

determining whether a sum of the heights of the object and annealing sets of powder layers exceeds the maximum available height of the build chamber;

in response to determining that the sum does not exceed the maximum available height of the build chamber, printing the series of objects in accordance with the calibrated print job by forming the object set of powder layers, and then the annealing set of powder layers; and in response to determining that the sum exceeds the maximum available height of the build chamber, not printing the series of objects in accordance with the calibrated print job, wherein the annealing set of powder layers are formed to insulate the printed series of objects to maintain a cooling profile during object cooling.

12. The powder-based additive manufacturing printer of claim 11, wherein the processing further comprises, in response to determining that the sum exceeds the maximum available height of the build chamber, modifying the calibrated print job by defining a new spatial arrangement that reduces the sum to below the maximum available height.

13. The powder-based additive manufacturing printer of claim 11, wherein the processing further comprises, in response to determining that the sum exceeds the maximum available height of the build chamber, modifying the calibrated print job by removing objects from the series of objects to reduce the sum to below the maximum available height.

14. The powder-based additive manufacturing printer of claim 11, wherein the processing further comprises, in response to determining that the sum exceeds the maximum available height of the build chamber:

calculating an amount by which the sum exceeds the maximum available height;

calculating a difference between the determined height of the annealing set of powder layers and the amount by which the sum exceeds the maximum available height;

comparing the difference with a minimum height of powder layers to maintain the cooling profile during object cooling; and determining whether to print the series of objects in accordance with the calibrated print job with less than the determined height of the annealing set of powder layers, based on a result of comparing the difference with the minimum height.

15. The powder-based additive manufacturing printer of claim 11, wherein the processing further comprises, in response to determining that the sum exceeds the maximum available height of the build chamber, indicating on a screen that the series of objects cannot be printed with the determined height of the annealing set of powder layers.

16. The method of claim 1, further comprising:

determining, by the printer, a height of a warming set of powder layers to be formed on a bed of the build chamber before the object set of powder layers, where no portion of any object is formed in the warming set, wherein the sum used in determining whether the sum exceeds the maximum available height of the build chamber further includes the height of the warming set of powder layers, such that the sum is of the heights of the warming, object, and annealing sets of powder layers, wherein the series of objects is printed in accordance with the calibrated print job by forming the warming set of powder layers before the object set of powder layers, and then the annealing set of powder layers, are formed, and wherein the warming set of powder layers are formed to improve thermal uniformity across the bed of the build chamber during object formation.

17. The method of claim 1, wherein printing the series of objects only when the sum does not exceed the maximum available height ensures that the series of objects do not suffer from defects due to the cooling profile not being maintained during object cooling.

18. The non-transitory computer-readable data storage medium of claim 6, wherein the processing further comprises:

determining a height of a warming set of powder layers to be formed on a bed of the build chamber before the object set of powder layers, where no portion of any object is formed in the warming set, wherein the sum used in determining whether the sum exceeds the maximum available height of the build chamber further includes the height of the warming set of powder layers, such that the sum is of the heights of the warming, object, and annealing sets of powder layers, wherein the series of objects is printed in accordance with the calibrated print job by forming the warming set of powder layers before the object set of powder layers, and then the annealing set of powder layers, are formed, and wherein the warming set of powder layers are formed to improve thermal uniformity across the bed of the build chamber during object formation.

19. The powder-based additive manufacturing printer of claim 11, wherein the processing further comprises:

determining a height of a warming set of powder layers to be formed on a bed of the build chamber before the object set of powder layers, where no portion of any object is formed in the warming set, wherein the sum used in determining whether the sum exceeds the maximum available height of the build chamber further includes the height of the warming set of powder layers, such that the sum is of the heights of the warming, object, and annealing sets of powder layers, wherein the series of objects is printed in accordance with the calibrated print job by forming the warming set of powder layers before the object set of powder layers, and then the annealing set of powder layers, are formed, and wherein the warming set of powder layers are formed to improve thermal uniformity across the bed of the build chamber during object formation.

\* \* \* \* \*